(No Model.)  2 Sheets—Sheet 1.
J. A. WOLFRAM.
Cotton Sprinkler.
No. 241,577.  Patented May 17, 1881.
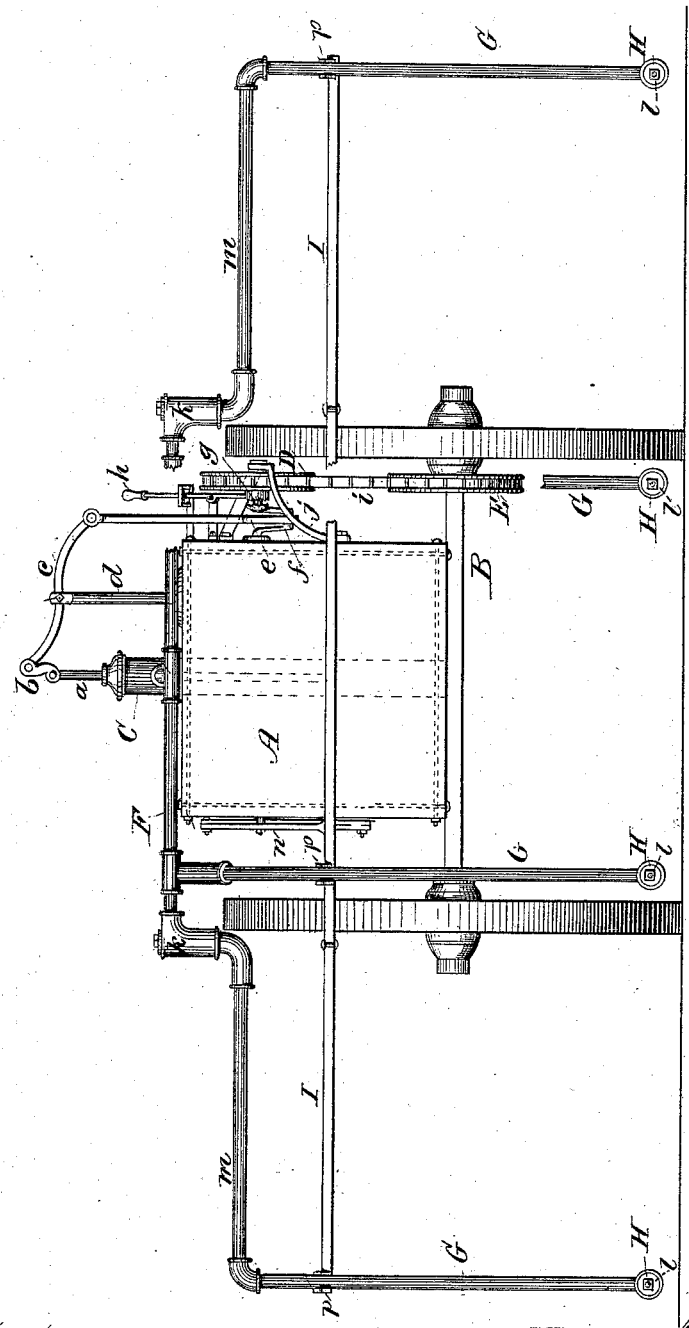
Witnesses:
Inventor:

(No Model.) 2 Sheets—Sheet 2.

J. A. WOLFRAM.
Cotton Sprinkler.

No. 241,577. Patented May 17, 1881.

Witnesses:

Inventor:
John A. Wolfram.

UNITED STATES PATENT OFFICE.

JOHN A. WOLFRAM, OF MEYERSVILLE, TEXAS.

COTTON-SPRINKLER.

SPECIFICATION forming part of Letters Patent No. 241,577, dated May 17, 1881.

Application filed May 10, 1880. (No model.)

*To all whom it may concern:*

Be it known that I, JOHN A. WOLFRAM, a citizen of the United States, residing at Meyersville, county of De Witt, and State of Texas, have invented certain new and useful Improvements in Cotton-Sprinklers; and I do hereby declare that the following is a full, clear, and exact description of the same, reference being had to the accompanying drawings, in which—

Figure 3:
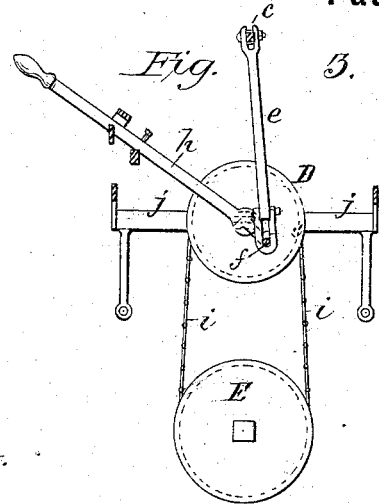
Figure 4:
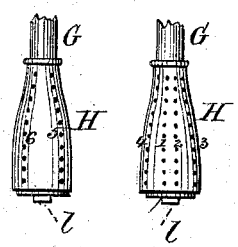
Figure 5:
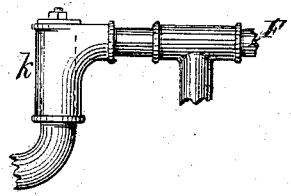
Figure 2:
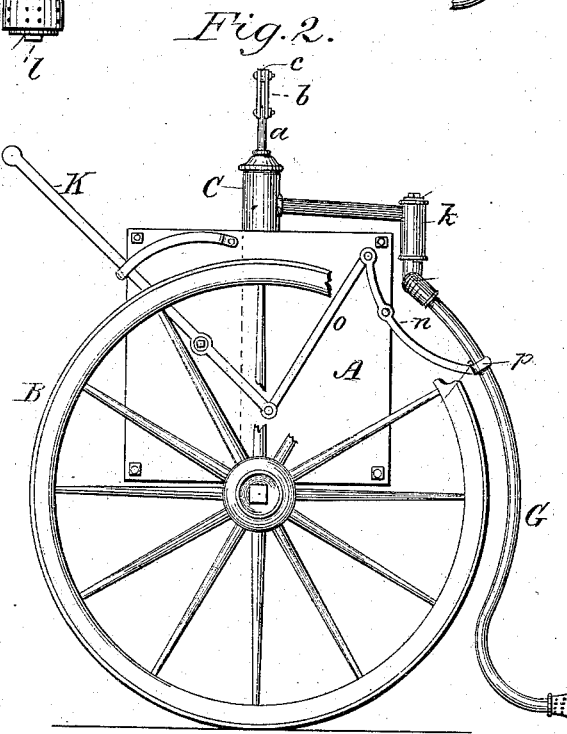

Figure 1 is a rear elevation of my invention; Fig. 2, a side elevation of the same; Fig. 3, a detail view of the mechanism for operating the pump-piston; Fig. 4, a similar view of the sprinklers; and Fig. 5 is a detail view of the faucet-connection to control the flow of liquid from the pump into the pipes.

The present invention has relation to certain new and useful improvements in machines or devices for throwing jets or sprays of poisonous liquid upon cotton and other plants; and the object thereof is to construct such machines or devices in a manner as will render them easy of operation, and sprinkle the plants from above, below, or underneath the leaves at one and the same time, thereby touching every portion of the plant, and so destroying every insect that may be on it without any unnecessary waste of the poisonous liquid. These objects I attain by the construction shown in the drawings and hereinafter described.

In the accompanying drawings, A represents a suitable reservoir or tank for holding the poisonous liquid, said tank being secured in any suitable manner to a carriage or truck, B.

To the tank A is attached a suitable pump, C, the piston $a$ thereof having connected to its upper end a link, $b$, which, in turn, is connected to an arm, $c$, pivoted to the upper end of a standard, $d$, rigidly secured to the top of the tank.

To the outer end of the arm $c$ is pivoted a rod, $e$, its lower end being connected to a crank, $f$, which has its bearings in the side of the tank A and grooved pulley D. The crank $f$ is made to engage with the grooved pulley D in such manner as will cause the crank to revolve by the rotation of the pulley. This I accomplish by the employment of the ordinary clutch, $g$, the two sections thereof being made to engage with each other by the lever $h$, which is connected thereto, or be disengaged when the pump is not required to be operated.

The grooved pulley D is supported by a suitable bracket, $j$, connected to the side of the tank A, while the lower grooved pulley, E, is rigidly secured to the inner side of the wheel carriage or truck, so that it will revolve with it. A belt or chain, $i$, passes over the two pulleys D E, by which motion is communicated to the upper pulley when the carriage or truck is in motion.

Connected to the pump C is a horizontal pipe, F, to the ends of which are suitable faucets, $k$, to control the flow of liquid to the sprinkling-pipes, these faucets being of any suitable construction found best adapted to the purpose.

To the horizontal pipe F is connected a suitable number of pipes, G, extending down near the ground, and provided at their lower ends with rose-heads H, each of which has removable screw-plugs $l$, to admit of their being cleaned when required. These pipes G are connected to the horizontal pipe F by unions or coupling-sections; or any other desirable means may be employed. The outer pipes, however, I connect to the pipe F by the additions of short sections $m$ of pipe, although I do not desire to confine myself to any special means employed. The pipes G are raised to the required height from the ground by a suitable lifting device, consisting of the horizontal supporting-arm I, formed in sections and hinged together, so that when opened and extended they form a continuous horizontal arm, against which the pipes G rest.

To the supporting-arm I is connected a curved rod, $n$, pivoted to the side of the tank A, and having connected to it a pivoted arm, $o$, to which the operating-lever K is secured, by means of which the supporting-arm I may be raised or lowered, as circumstances require. This supporting-arm or carrier I has semicircular seats $p$, to receive the pipes G and hold them in an upright position. The object of forming the arm or carrier I in sections and hinging them together is to reduce the length of the same, so as to enable the folding of the pipes from both sides of the carriage or truck when not required for use.

The rose-heads H are preferably formed with rows 1, 2, 3, 4, 5, and 6, extending lengthwise and upon the sides of said rose-heads, so that the plants will be sprinkled above and beneath the leaves.

The unions of the several sections of pipes admit of their being folded conveniently together, so as to admit of their being transported with ease and without incumbrance.

The machine will sprinkle as many rows of cotton as there are pipes G, they being the required distance apart to correspond to the distance between the rows, the hinged sections of the supporting-arms or carriers being opened and extended in accordance with the number of pipes G that are used.

Having now fully described my invention, what I claim as new, and desire to secure by Letters Patent, is—

1. In a cotton or other plant sprinkler, the reservoir or tank A, mounted upon a suitable carriage or truck, and having connected thereto a pump, C, in combination with the grooved pulley E, rigidly secured to the wheel of the carriage or truck, belt or chain $i$, pulley D, clutch $g$, and crank $f$, connected by suitable levers or arms to the piston-rod $a$, substantially as and for the purpose set forth.

2. In a cotton-sprinkler, the combination, with the pipes G, provided with rose-heads H, of the arm or carrier I, formed in sections and connected to a suitable lever for raising or lowering it, substantially as and for the purpose specified.

JOHN ARNOLD WOLFRAM.

Witnesses:
F. PHILIPP TRENCK,
F. SCHIWETZ.